（12）United States Patent
Fechner et al.

(10) Patent No.: US 10,209,480 B2
(45) Date of Patent: Feb. 19, 2019

(54) CAMERA SYSTEM IN OR FOR A MOTOR VEHICLE AND DRIVER ASSISTANCE SYSTEM

(71) Applicant: Conti Temic microelectronic GmbH, Nürnberg (DE)

(72) Inventors: Thomas Fechner, Wasserburg (DE); Dieter Krökel, Eriskirch (DE)

(73) Assignee: CONTI TEMIC MICROELECTRONIC GMBH, Nürnberg (DE)

( * ) Notice: Subject to any disclaimer, the term of this patent is extended or adjusted under 35 U.S.C. 154(b) by 0 days.

(21) Appl. No.: 15/817,635

(22) Filed: Nov. 20, 2017

(65) Prior Publication Data

US 2018/0149827 A1 May 31, 2018

(30) Foreign Application Priority Data

Nov. 29, 2016 (DE) .......................... 10 2016 223 709

(51) Int. Cl.

| | |
|---|---|
| H04N 5/225 | (2006.01) |
| G02B 7/02 | (2006.01) |
| G02B 1/04 | (2006.01) |
| G02B 13/06 | (2006.01) |
| G03B 17/55 | (2006.01) |
| H04N 17/00 | (2006.01) |
| B60R 11/04 | (2006.01) |

(52) U.S. Cl.

CPC ............. *G02B 7/028* (2013.01); *G02B 1/041* (2013.01); *G02B 7/021* (2013.01); *G02B 13/06* (2013.01); *G03B 17/55* (2013.01); *H04N 5/2253* (2013.01); *H04N 17/002* (2013.01); *B60R 11/04* (2013.01)

(58) Field of Classification Search

CPC .................................................. H04N 5/2253
USPC .......................................................... 348/373
See application file for complete search history.

(56) References Cited

U.S. PATENT DOCUMENTS

| 9,208,388 B2 | 12/2015 | Zobel | |
| 9,383,540 B1* | 7/2016 | Gandhi | .................. G02B 7/008 |
| 2010/0039714 A1* | 2/2010 | Bloch | ..................... G02B 7/008 |
| | | | 359/820 |
| 2016/0054546 A1* | 2/2016 | Yin | ........................ G02B 13/06 |
| | | | 359/716 |

FOREIGN PATENT DOCUMENTS

| DE | 102013020894 B3 | 4/2015 |
| DE | 102009048323 A | 12/2015 |

OTHER PUBLICATIONS

German Search Report dated Jul. 4, 2017 for corresponding German Patent Application No. 10 2016 223 709.8.

\* cited by examiner

*Primary Examiner* — Joel W Fosselman

(57) ABSTRACT

A camera arrangement for or in a motor vehicle includes at least one objective with each objective including at least one lens. A temperature measurement device is configured to measure the temperature of the objective and/or of the environment of the objective. A temperature adjustment device is thermally coupled to the at least one objective and configured to adjust the temperature of the objective as a function of the measured temperature.

21 Claims, 2 Drawing Sheets

CAMERA SYSTEM IN OR FOR A MOTOR VEHICLE AND DRIVER ASSISTANCE SYSTEM

CROSS REFERENCE TO RELATED APPLICATION

This application claims the benefit of German patent application No. 10 2016 223 709.8, filed Nov. 29, 2016, which is hereby incorporated by reference.

TECHNICAL FIELD

The technical field relates to a camera system in or for a motor vehicle as well as a driver assistance system.

BACKGROUND

Motor vehicle cameras are an essential part of driver assistance systems in modern motor vehicles.

Widespread use is made, for example, of reversing cameras, which can be fitted in the tail end of a motor vehicle. When reverse gear is selected the reversing camera is automatically triggered by a control unit, so that through the interposition of a suitable image processing unit the vehicle environment in the tail area can be shown to the driver on a display in the vehicle interior.

The purpose of such camera systems is frequently to improve road safety by avoiding hazardous situations. By way of example, motor vehicle cameras are used to support automatic distance monitoring systems (ACC=Adaptive Cruise Control), to support safety systems (pre-crash systems, lane assist systems, etc.), and to support parking aids, and the like.

A camera system in a motor vehicle can also be used to increase comfort by relieving the driver of stress and facilitating orientation through environment information conveyed according to the situation or in a way that makes sense to the driver, as for example is the case with assistance systems with traffic sign recognition and/or lane detection or road marking recognition. Such traffic sign recognition or road marking recognition methods typically use a camera to capture the environment alongside or behind the vehicle, evaluate the image data captured and detect in the image data the presence of certain traffic signs or road markings in the actual lane, and possibly those adjacent to it, and the position of the vehicle itself relative to these road markings.

A driver assistance system with a method for detecting road markings is, for example, described in DE 10 2009 048 323 A1.

The core of such camera systems is a suitable optical system. Objectives designed for automotive applications must be designed in such a way that within the relevant temperature range for automotive applications of −40° C. to +95° C. they guarantee the required imaging characteristics. This is especially difficult with objectives which when used as intended are exposed to considerable temperature fluctuations, such as for example cameras arranged behind the windshield, which for example and especially in summer can become very hot, or cameras outside of the vehicle, which in winter can become very cold at extreme temperatures.

For reasons of cost, in present-day camera systems sometimes plastic lenses are preferred to the more expensive and comparatively less resistant glass objectives. The problem here, though, is that the optical characteristics of objectives, such as for example the refractive index, can change according to the temperature. This occurs especially in objectives with plastic lenses, where the optical characteristics are more temperature-sensitive than objectives that use glass lenses.

On top of this, the demands in terms of the optical characteristics of objectives are increasing due to the need for a greater aperture angle and simultaneous longer range in the center of the objective, as in the case with non-linear objectives.

Against this background it is desirable to achieve an improved camera arrangement for motor vehicles. In addition, other desirable features and characteristics will become apparent from the subsequent summary and detailed description, and the appended claims, taken in conjunction with the accompanying drawings and this background.

SUMMARY

A camera arrangement for or in a motor vehicle includes at least one objective with in each case at least one lens. The camera arrangement also includes a temperature measurement device, configured to measure the temperature of the objective and/or of the environment of the objective. A temperature adjustment device is thermally coupled to the at least one objective and configured to adjust the temperature of the objective as a function of the measured temperature.

A driver assistance system in or for a motor vehicle, with at least one camera arrangement as described herein, is also disclosed.

One concept is to reduce the effective temperature range to which an objective of a motor vehicle camera is exposed during operation, even at the comparatively high temperatures in the range of −40° C. to +85° C. of automotive applications. This is achieved by the temperature of the objective of the camera being specifically adjusted by a suitable temperature adjustment device. By restricting or reducing the effective temperature range of the objective under operating conditions, an additional degree of freedom is obtained while maintaining the optical specification and characteristics of the objective. In particular, objectives, such as for example non-linear objectives, can for example be provided, which are able to manage with fewer lenses. The corresponding objectives can thus also be provided at lower cost.

Advantageous configurations and developments are indicated by the further dependent claims and by the description, which refers to the figures in the drawing.

In a possible embodiment of the camera arrangement, the temperature adjustment device includes a control device. The control device is configured to adjust the temperature of the lens or of the objective by cooling and/or heating to a predetermined temperature. In this way, changes in the optical characteristics of the objectives or their lenses are almost completely suppressed.

In an exemplary configuration, the temperature adjustment device alternatively—or additionally—includes a regulating device. This regulating device is configured to regulate the temperature of the lens so that it remains in a predetermined temperature range. This predetermined temperature range is selected here so that within the predetermined temperature range the changes in the optical characteristics of the respective objective or its lenses are noticed only very slightly and in terms of the image processing and evaluation are to the greatest possible extent acceptable. The predetermined temperature range may be between 50° C. and 85° C., and more particularly between 65° C. and 85° C.

Regulation in the predetermined temperature range may take place by means of pulse width modulation ("PWM").

In an exemplary development the temperature adjustment device includes a cooling device. The cooling device is configured to cool the objective, by way of example if the measured temperature of this is above a predetermined temperature range, such as, for example, 65° C. to 85° C.

Additionally, or alternatively, the temperature adjustment device may also include a heating device. The heating device is configured to heat up the objective, by way of example if the measured temperature of this is below a predetermined temperature range, such as for example 65° C. to 85° C.

In an exemplary configuration, the heating device may comprise a heating wire or a heating coil. This heating wire or the heating coil can for example be integrated in a housing of the objective, so that if necessary the objective and thus also its lens can thereby be heated up. To heat up the objective, the heating wire or the heating coil can additionally or alternatively also be thermally coupled to the housing of the objective.

In one exemplary configuration, the temperature adjustment device includes an interface, via which the heating device can be coupled to a heating wire of the windshield heating. Via this interface, the camera arrangement is able to simply and neatly tap a heating current of a windshield heating system and use it for objective heating.

In one exemplary embodiment of the camera arrangement, at least one lens is configured as a plastic lens. Such plastic lenses, which are less expensive than glass lenses, nevertheless have very good optical characteristics due to the temperature regulation. In particular, the deterioration in characteristics of plastic lenses under extreme temperature conditions can be very simply, inexpensively and effectively suppressed or at least reduced.

In another exemplary configuration, at least one objective has non-linear optical characteristics, in particular with a widened field of view (FoV). In the non-linear peripheral area of such objectives, especially, in the absence of temperature regulation and under extreme temperature conditions the temperature-related deterioration in the optical characteristics can have particularly marked effects. If the temperature regulation is used, such objectives, even at extreme temperatures, can be used reliably, without having to take into account a deterioration in optical quality in the peripheral area. Specially molded lenses may also be used, such as for example lenses with a highly convex surface form, lenses with a parabolic surface form, and the like. Regarding high-resolution image converters (or imagers), depending on the need, in this way a specific design of the objective of the vehicle camera can be achieved.

In another exemplary configuration, at least one objective is configured as a fisheye objective. Such a fisheye objective, or fisheye for short, in the optical system means a special objective, which unlike conventional optical systems represents a hemisphere with significant, but not excessive distortions in the focal plane, so that straight lines, not running through the center of the image, are represented bent. Fisheye objectives typically have a very large image angle, which is generally beyond the capability of conventional objectives. Despite the extraordinarily large image angle, the decrease in brightness towards the edge of the image is relatively small and also easily correctible.

One exemplary development provides for a lens arrangement with a plurality of individual lenses arranged in a stack. Here, for example, each of these individual lenses can be individually controlled and/or their image information separately recorded and evaluated. The form, size and optical characteristics of the individual lenses may also be varied.

The camera arrangement may be configured as a stereo camera. Such a stereo camera usually has at least two objectives. A stereo camera means a special photographic device for taking stereoscopic photographs (3D-photography, 3D-film). Stereo cameras generally have two objectives arranged one next to the other, the shutter release of which takes place in synch, wherein the exposure control and focus adjustment of the two objectives are usually coupled. When triggered, stereo cameras allow simultaneous capture of the two stereoscopic fields necessary for 3D images, which following transposition when viewed in the stereoscope combine to give a cohesive spatial impression. A stereo camera for producing lens raster images may also have four objectives.

In an exemplary application, the camera arrangement is configured as a motor vehicle front camera, by way of example for traffic sign recognition, lane detection, detection of vehicles ahead, detection of persons in the frontal environment of the motor vehicle, etc. The front camera has a housing with a housing mounting area, which is positioned and configured on the housing so that it can be placed behind the windshield of a motor vehicle in such a way that the lens or the objective is aligned in the direction of travel with a more or less free field of view. Alternatively, the camera arrangement can also be configured as a reversing camera, by way of example in connection with a parking aid.

In an exemplary embodiment of the camera arrangement, at least one image converter is provided. The image converter is coupled with the objective or the corresponding lens(es) and is designed to convert the image information captured by the objective or the corresponding lens(es) into electrical image signals. Such an image converter can, by way of example, be an image sensor, or imager for short. An image sensor or imager is understood to be a device for recording two-dimensional images from light by mechanical or electrical means. In most cases semiconductor-based image sensors are used, able to record visible or no longer visible light with spectra up to mid-infrared. Depending on the desired spectral range these can also be two-dimensional.

The image converter may include its own temperature sensor. This temperature sensor of the image converter may be used as a temperature measurement device for determining the temperature of the objective. Alternatively, for the temperature measurement device, however, a separate temperature sensor can also be employed.

In a further embodiment of the camera arrangement, an image processing device is provided. This image processing device is configured to evaluate the converted electrical image signals. Image processing is understood to be the processing of electrical signals, which represent images. The result of an image processing can in turn be an image or also a number of features of the input image. In most cases images are considered as two-dimensional signals, so that for the image processing and especially for the evaluation, the methods known from signal processing can be applied.

In one configuration, the temperature adjustment device is configured to adjust and/or regulate the temperature of the objective as a function of the evaluated image signals. In this way, in a particularly effective manner, the temperature of the objective is only impinged upon if during the analysis and evaluation the image information recorded indicates that this is necessary, or if an analysis and evaluation is no longer giving satisfactory results. In this way, the temperature regulation and thus the associated energy consumption can be reduced to a minimum.

In another configuration, the image processing device is configured to determine the sharpness of the image information recorded. The temperature adjustment device is configured to adjust the temperature of the objective as a function of the sharpness determined. In this way, in a likewise particularly effective manner, the temperature of the objective is only impinged upon if the analysis and evaluation of the image information recorded indicates that this, at least in a sub-area, is no longer or no longer sufficiently sharp. Through this measure it may also be ensured that the temperature regulation and the associated energy consumption are reduced to a minimum.

The above configurations and developments can, where expedient, be optionally combined with one another. Further possible configurations, developments and implementations of the disclosure also comprise combinations, not expressly mentioned, of the features of the disclosure described above or below in relation to the exemplary embodiments. In particular, the person skilled in the art will also add individual aspects as improvements or additions to the respective basic form of the present invention.

BRIEF DESCRIPTION OF THE DRAWINGS

The present disclosure is explained in more detail below using the exemplary embodiments indicated in the schematic figures of the drawings. These show as follows.

Figure 1:
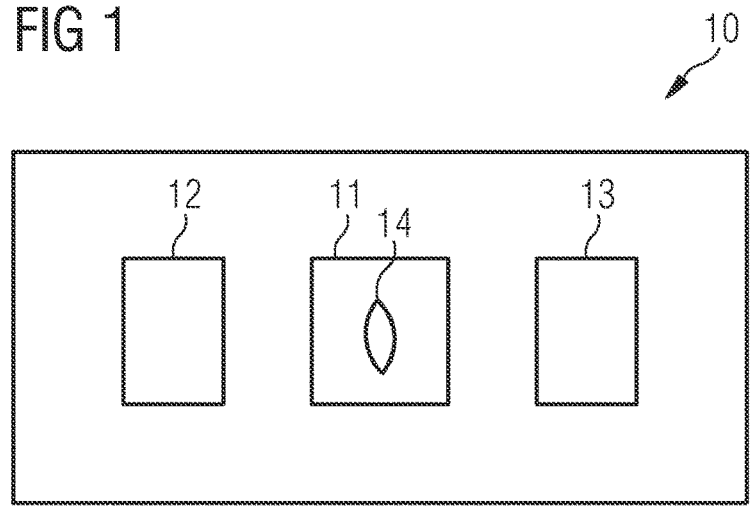
FIG. 1 is a block diagram to illustrate a first, general exemplary embodiment of a camera arrangement.

The attached drawings are intended to provide a further understanding of the written disclosure. They illustrate embodiments and serve in association with the description to explain principles and concepts of the disclosure. Other embodiments and many of the stated advantages are indicated with regard to the drawings. The elements of the drawings are not necessarily shown true to scale in relation to one another.

In the figures of the drawing the same, functionally identical elements, features and components with identical effect—unless otherwise stated—are given the same reference numerals in each case.

DETAILED DESCRIPTION

FIG. 1 shows a block diagram to illustrate a first, general exemplary embodiment of a camera arrangement.

The camera arrangement referred to here by reference numeral 10 is configured for use in a motor vehicle, by way of example in a passenger car or a truck, but could be used elsewhere. The camera arrangement 10 has an objective 11, a temperature measurement device 12 as well as a temperature adjustment device 13.

The objective 11, often also referred to as an optical system, is an image collection optical system, generating a true optical image of an item (object). Here, the objective 11 is positioned between the object and the image. In the example shown, the objective 11 has a single plastic lens 14. The objective 11 can, for example, be an objective with non-linear optical characteristics, in particular with a widened field of view, such as for example a fisheye objective.

The temperature measurement device 12 is thermally coupled to the objective 11. The temperature measurement device 12 may be arranged in the immediate vicinity of the objective 11 or even positioned on the objective 11. The temperature measurement device 12 is designed to measure the temperature of the objective 11 and/or of the environment of the objective 11. To this end the temperature measurement device 12 typically comprises a suitable temperature sensor, by way of example a measuring resistor, an integrated semiconductor temperature sensor, a transistor connected as a diode, etc.

The temperature adjustment device 13 is similarly thermally coupled to the objective 11, and may arranged in the immediate vicinity of the objective 11 or positioned on the objective 11 or on the lens 14. The temperature adjustment device 13 is configured to adjust the temperature of the objective 11 or of its lens 14 as a function of the temperature measured by the temperature measurement device 12. Here, the temperature adjustment can take place according to suitable control parameters or by regulation according to suitable regulating parameters.

Figure 2:
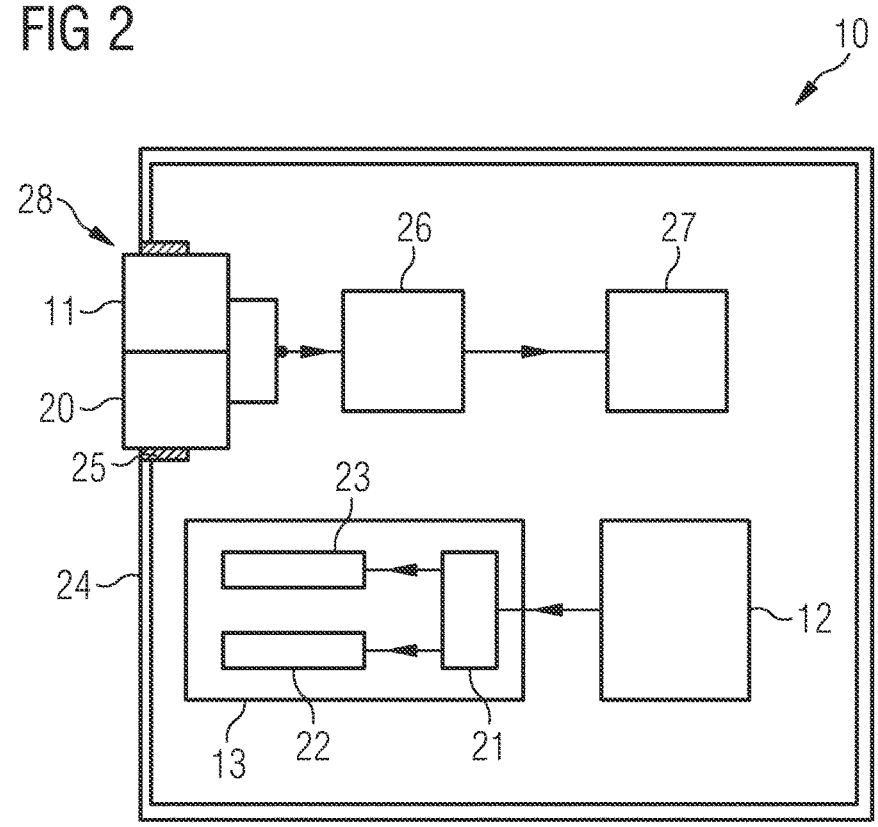
FIG. 2 is a block diagram to illustrate a second exemplary embodiment of the camera arrangement.

FIG. 2 shows a block diagram to illustrate a second exemplary embodiment of the camera arrangement.

Unlike the example in FIG. 1, here the camera arrangement 10 is configured as a stereo camera 10. Apart from the objective 11, the camera arrangement 10 thus has a second objective 20 arranged immediately alongside it.

The temperature adjustment device 13 in FIG. 2 comprises a regulating device 21, a heating device 22 and a cooling device 23. Here, the regulating device 21 is connected on the input side with the temperature measurement device 12, in order to obtain information on the measured temperature of the objective. On the output side, the regulating device 21 triggers the heating device 22 and the cooling device 23.

By operation of the regulating device 21 the temperature of the objectives 11, 20 can be adjusted in a predetermined temperature range, for example within a temperature range of 65° C. to 85° C. Here, the temperature regulation may take place by pulse width modulation. For the temperature regulation, firstly the heating device 22 is provided. By operation of the heating device 22, which by way of example can be configured as a heating wire or heating coil, the objectives 11, 20 of the stereo camera can be heated. The temperature regulation may also offer cooling of the objectives 11, 20 by operation of the suitably configured cooling device 23.

The camera arrangement 10 is configured in FIG. 2 as a front camera of a vehicle for traffic sign recognition. To this end, the housing 24 of the camera arrangement 10 has a mounting interface 25, via which the camera arrangement 10 can be attached in the passenger compartment, by way of example immediately behind the rearview mirror, on the windshield of the vehicle. Here, the objectives 11, 20 protrude through corresponding recesses 28 of the housing 24 and are aligned in such a way that in the mounted state in the direction of travel they have a free field of view.

The camera arrangement 10 also has an image converter 26, referred to as the imager 26, as well as an image processing device 27. The image converter 26 is coupled to the objectives 11, 20, in such a way as to convert the image information recorded by the objectives 11, 20 into electrical image signals or video sequences, which are then fed to the downstream image processing device 27. The image processing device 27 is configured to evaluate and analyze the converted electrical image signals or video sequences, and if necessary to further process these and/or output them in a suitably prepared form.

Figure 3:
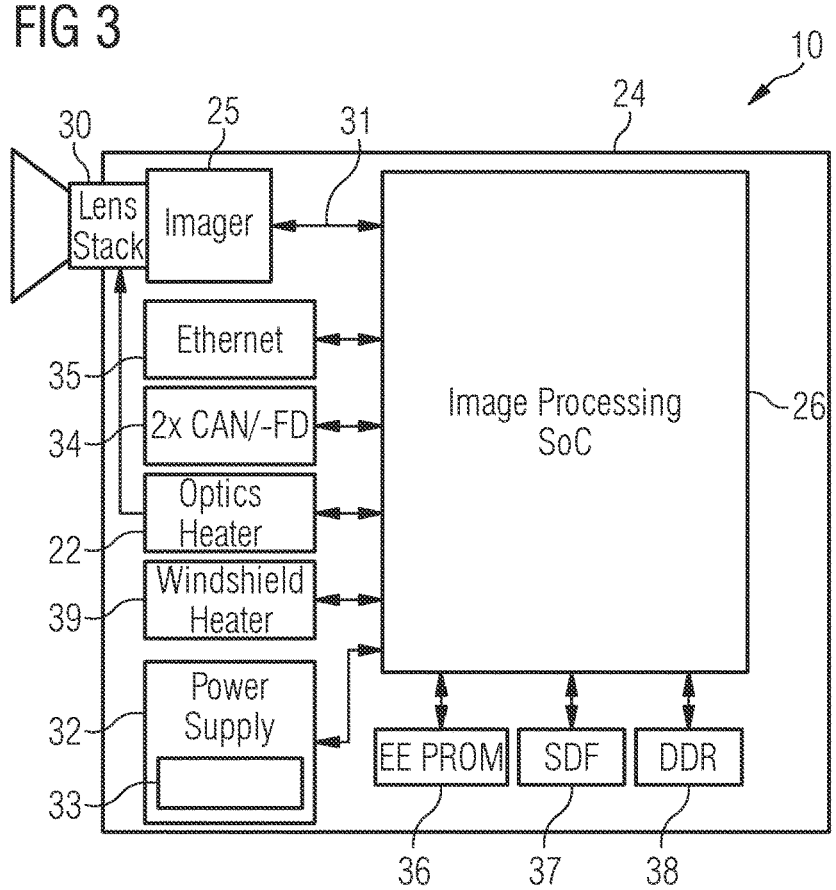
FIG. 3 is a block diagram to illustrate a third, special exemplary embodiment of the camera arrangement.

FIG. 3 shows a block diagram to illustrate a third, special exemplary embodiment of the camera arrangement.

Unlike the exemplary embodiments of FIGS. 2 and 3, here the objective is configured as a lens stack 30 with a plurality of individual lenses. These individual lenses (not shown in FIG. 3) are configured and arranged in relation to one another in such a way that the objective 30 resulting from the plurality of lenses arranged in a stack, allows a substantially widened field of view.

On the output side, the lens stack 30 is coupled to the imager 25, which in turn is coupled by means of an imager interface 31 with a SoC-image processing device 26.

In addition, the camera arrangement 10 also has an energy supply 32, a watchdog 33, at least two data and/or control interfaces 34, such as for example a CAN interface, and an Ethernet interface 35.

The camera arrangement 10 also has various memories 36-38, such as for example a read-only memory 36 (EEPROM), an SDF memory 37 and what is known as a double-data-rate memory 38 (DDR). The memories 36-38 can, for example, be used for buffering the image information recorded and evaluated by the image processing device 27.

Apart from the heating device 22 for heating of the objective 30, a further heating device 39 is provided here for heating the windshield.

Figure 4:
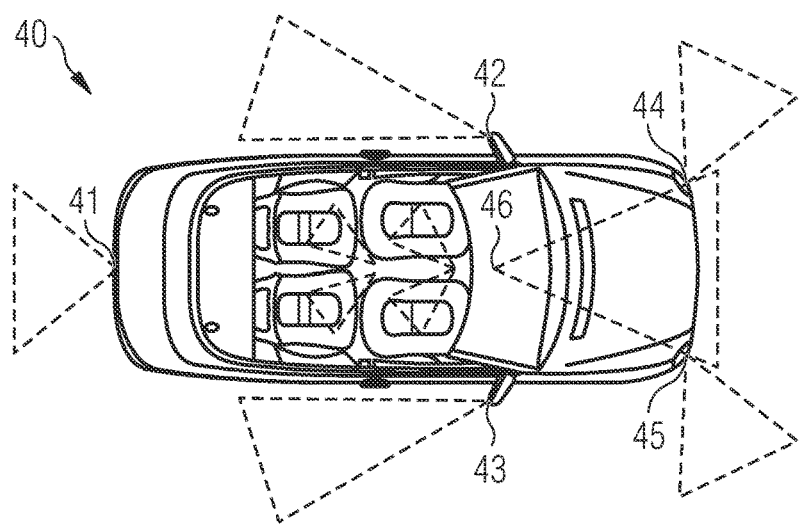
FIG. 4 is a motor vehicle with a driver assistance system.

FIG. 4 shows a motor vehicle 40, equipped with a plurality of driver assistance systems. To this end, the motor vehicle 40 comprises a plurality of different camera arrangements 41-46 as follows:

A camera arrangement 41 arranged in the tail end of the motor vehicle 40, by way of example above a rear bumper covering in the vicinity of a lock support, allowing a rearward view.

A camera arrangement 42 or 43 integrated into the left wing mirror and into the right wing mirror, monitoring the lateral rear areas, by way of example to monitor the blind spot.

A camera arrangement 44 or 45 integrated into the left fender and into the right fender in the vicinity of the headlamp, monitoring forward facing lateral areas, by way of example similarly for monitoring the blind spot.

A front camera arrangement 46, secured internally to the windshield of the motor vehicle and which for example serves for traffic sign recognition, lane detection, etc.

It is particularly advantageous if at least the front camera arrangement 46 is configured as a camera arrangement 10 as represented by FIGS. 1 to 3. It would also be advantageous, however, if at least one of the other camera arrangements 41-45 were configured as a camera arrangement 10 as represented by FIGS. 1 to 3.

Though the present invention has been fully described above on the basis of exemplary embodiments, it is not restricted to these, but can be modified in multiple ways.

LIST OF REFERENCE NUMERALS

10 Camera arrangement
11 Objective
12 Temperature measurement device
13 Temperature adjustment device
14 (Plastic)lens
20 Second objective (of a stereo camera)
21 Regulating device
22 Heating device
23 Cooling device
24 Housing
25 Mounting interface
26 Image converter, imager, image sensor
27 Image processing device
28 Recess
30 Lens stack, objective
31 Imager interface
32 Energy supply
33 Watchdog
34 Data and/or control interfaces, CAN interface
35 Ethernet interface
36 Read-only memory, EEPROM
37 SDF memory
38 DDR memory
39 Heating device
40 Motor vehicle
41-46 Camera arrangements

The invention claimed is:

1. A camera arrangement for a motor vehicle, comprising:
at least one objective with in each case at least one lens,
a temperature measurement device configured to measure the temperature of the objective and/or of the environment of the objective,
a temperature adjustment device thermally coupled to the at least one objective and configured to adjust the temperature of the objective as a function of the measured temperature,
wherein the temperature adjustment device includes a heating device configured to heat the objective,
wherein the temperature adjustment device includes an interface, via which the heating device can be coupled to a heating wire of a windshield heater and via which a heat flow can be tapped for heating the objective.

2. The camera arrangement of claim 1, wherein the temperature adjustment device includes a regulating device configured to adjust the temperature of the lens to a predetermined temperature.

3. The camera arrangement of claim 1, wherein the temperature adjustment device includes a regulating device configured to regulate the temperature of the lens in a predetermined temperature range.

4. The camera arrangement of claim 3, wherein the regulating device is configured to perform pulse-width modulated regulation.

5. The camera arrangement of claim 1, wherein the temperature adjustment device includes a cooling device, configured to cool the objective.

6. The camera arrangement of claim 1, wherein the heating device includes a heating wire, which is at least partly integrated into a housing of the objective and/or thermally coupled to the housing of the objective.

7. The camera arrangement of claim 1, wherein the at least one lens is configured as a plastic lens.

8. The camera arrangement of claim 1, wherein the at least one objective has non-linear optical characteristics including a widened field of view.

9. The camera arrangement of claim 1, wherein the at least one objective is configured as a fisheye objective.

10. The camera arrangement of claim 1, wherein the objective comprises a plurality of individual lenses arranged in a stack.

11. The camera arrangement claim 1, wherein the camera arrangement is configured as a stereo camera.

12. The camera arrangement of claim 1, wherein the camera arrangement is configured as a front camera and wherein the camera arrangement includes a housing with a mounting area positioned and configured on the housing to be attached behind the windshield of a motor vehicle in such a way that the objective or its lens is aligned in the direction of travel with a free field of view.

13. The camera arrangement of claim 1, further comprising at least one image converter coupled to the objective and configured to convert the image information recorded by the objective into electrical image signals.

14. The camera arrangement of claim 13, wherein the image converter includes a temperature sensor, which forms the temperature measurement device.

15. The camera arrangement of claim 13, further comprising an image processing device configured to analyze the converted electrical image signals.

16. The camera arrangement of claim 15, wherein the temperature adjustment device is configured to adjust and/or regulate the temperature of the objective as a function of the converted electrical image signals.

17. The camera arrangement of claim 15, wherein the image processing device is configured to determine the sharpness of the image information recorded, wherein the temperature adjustment device is configured to adjust the temperature of the objective as a function of the sharpness determined.

18. A camera arrangement for a motor vehicle, comprising:
    at least one objective with in each case at least one lens,
    a temperature measurement device configured to measure the temperature of the objective and/or of the environment of the objective,
    a temperature adjustment device thermally coupled to the at least one objective and configured to adjust the temperature of the objective as a function of the measured temperature,
    wherein the camera arrangement is configured as a stereo camera.

19. A camera arrangement for a motor vehicle, comprising:
    at least one objective with in each case at least one lens,
    a temperature measurement device configured to measure the temperature of the objective and/or of the environment of the objective,
    a temperature adjustment device thermally coupled to the at least one objective and configured to adjust the temperature of the objective as a function of the measured temperature,
    wherein the camera arrangement is configured as a front camera and wherein the camera arrangement includes a housing with a mounting area positioned and configured on the housing to be attached behind the windshield of a motor vehicle in such a way that the objective or its lens is aligned in the direction of travel with a free field of view.

20. A camera arrangement for a motor vehicle, comprising:
    at least one objective with in each case at least one lens,
    a temperature measurement device configured to measure the temperature of the objective and/or of the environment of the objective,
    a temperature adjustment device thermally coupled to the at least one objective and configured to adjust the temperature of the objective as a function of the measured temperature,
    at least one image converter coupled to the objective and configured to convert the image information recorded by the objective into electrical image signals, and
    an image processing device configured to analyze the converted electrical image signals,
    wherein the temperature adjustment device is configured to adjust and/or regulate the temperature of the objective as a function of the converted electrical image signals.

21. A camera arrangement for a motor vehicle, comprising:
    at least one objective with in each case at least one lens,
    a temperature measurement device configured to measure the temperature of the objective and/or of the environment of the objective,
    a temperature adjustment device thermally coupled to the at least one objective and configured to adjust the temperature of the objective as a function of the measured temperature,
    at least one image converter coupled to the objective and configured to convert the image information recorded by the objective into electrical image signals, and
    an image processing device configured to analyze the converted electrical image signals,
    herein the image processing device is configured to determine the sharpness of the image information recorded, wherein the temperature adjustment device is configured to adjust the temperature of the objective as a function of the sharpness determined.

* * * * *